United States Patent [19]

Carollo et al.

[11] 4,433,277
[45] Feb. 21, 1984

[54] BATTERY CHARGING SYSTEM

[75] Inventors: James A. Carollo; Wayne A. Kalinsky, both of Cedar Rapids, Iowa

[73] Assignee: Rockwell International Corporation, El Segundo, Calif.

[21] Appl. No.: 390,151

[22] Filed: Jun. 21, 1982

[51] Int. Cl.³ .............................................. H02J 7/00
[52] U.S. Cl. ..................................... 320/24; 320/15; 320/33; 320/36; 320/40; 320/43
[58] Field of Search ...................... 320/5, 6, 15, 20, 22, 320/23, 24, 30, 31, 32, 33, 34, 35, 36, 39, 40, 43, 45

[56] References Cited

U.S. PATENT DOCUMENTS

| | | | |
|---|---|---|---|
| 3,600,661 | 9/1971 | Briggs et al. | 320/35 |
| 3,855,516 | 12/1974 | Fairchild | 320/22 |
| 4,052,656 | 10/1977 | Lavell et al. | 320/32 |

Primary Examiner—William M. Shoop
Assistant Examiner—Anita M. Ault
Attorney, Agent, or Firm—Richard K. Robinson; George A. Montanye; H. Fredrick Hamann

[57] ABSTRACT

A battery charger utilizes three basic modes of operation that includes a maintenance mode, a rapid charge mode and time controlled limited charging mode. The device utilizes feedback from the battery being charged of voltage, current and temperature to determine the mode of operation and the time period during which the battery is being charged.

10 Claims, 1 Drawing Figure

BATTERY CHARGING SYSTEM

BACKGROUND OF THE INVENTION

The Government has rights in this invention pursuant to Contract.

This invention relates to battery chargers for charging and maintaining a battery at a 100 percent condition and in particular to battery chargers that will charge and maintain a battery at a 100 percent charge condition without overcharging the battery.

There are several prior art types of battery chargers that will in the process of charging a battery such as a lead acid battery to a 100 percent charge condition damage the storage cells of the lead acid battery. One type of charger is the taper current battery charger. The output characteristics of the taper current charger are such that as the voltage of the battery to which the charger is connected increases during charge, the charging current decreases. This type of charger in order not to damage the storage cells of the battery by excessive overcharging, requires an elongated charging time. Additionally, this type of charger will continue to charge the storage cells after they have reached 100 percent storage capacity thus overcharging them. Overcharging of a storage cell, especially a lead acid storage cell, will gradually reduce the capacity of the cells due to evaporation or loss of the electrolyte.

A second type of battery charger is the constant voltage type of charger which will subject the storage cells to excessive high charge current rates at the beginning of the charge cycles. The excessive high charge current rate is detrimental to the life of the storage cell. An alternate embodiment of the constant voltage charger is a constant voltage charger which has current limiting capabilities that avoid the high charge current rates. This system, however, is still very inadequate because if the constant voltage point of the charger is set high enough to charge the storage cells back to 100 percent capacity, impedance change within the storage cells will cause the charger to give full current even after the storage cell is fully charged; thus overcharging the cell and greatly deteriorating the life of the battery.

An alternate type of charger is a constant current charger which suffers the inadequacies of either overcharging the storage cell to its detriment or having a charge time so long that it takes an inordinate amount of time to completely charge the battery.

An alternative charging system is a two-step constant current charger which provides a current limit level for charging and then a low current limit level or trickle charge for maintaining a low charging current to the battery. The terminal voltage of the storage cell is used to determine when the charger current is to change to a lower level trickle charge. However, a trickle charge takes a large amount of time to return the storage cells back to a fully charged condition and if the trickle charge rate were to increase then the probability of damaging the storage cells would also be increased.

SUMMARY OF THE INVENTION

A battery charger utilizes three basic modes of operation a maintenance mode, a rapid charge mode and time controlled limited charging mode. The device utilizes feedback of voltage, current and temperature from the battery being charged to determine the mode of operation and the time period during which the battery is being charged.

It is the objective of this invention to provide a battery charger that will sense the charge of a battery connected thereto and, based upon the sensed charge, will initiate either a maintenance mode of operation if the charge is greater than a first predetermined level or a charging mode of operation if the charge of the battery is less than a first predetermined level.

It is another objective of the invention to provide a battery charger that will under the initial charge conditions charge the battery at the maximum possible rate without causing damage to the storage cells of the battery that is being charged.

It is yet another objective of the invention to provide a battery charger that will, after the battery has reached a second predetermined level of charge, charge the battery at a controlled time-rate of charge to protect the storage cells from being overcharged and damaged, yet achieve full charge in a minimum amount of time.

It is yet another objective of the invention to provide a battery charger that will maintain a fully charged cell with a maintenance voltage which varies with temperature to insure full charge over a large range of temperatures, and a long life of the storage cell.

BRIEF DESCRIPTION OF THE FIGURES

In order that the invention may be readily carried into practice, an embodiment will now be described in detail by way of example, with reference to the accompanying drawing in which.

DETAILED DESCRIPTION OF THE PREFERRED EMBODIMENT

Figure 1:
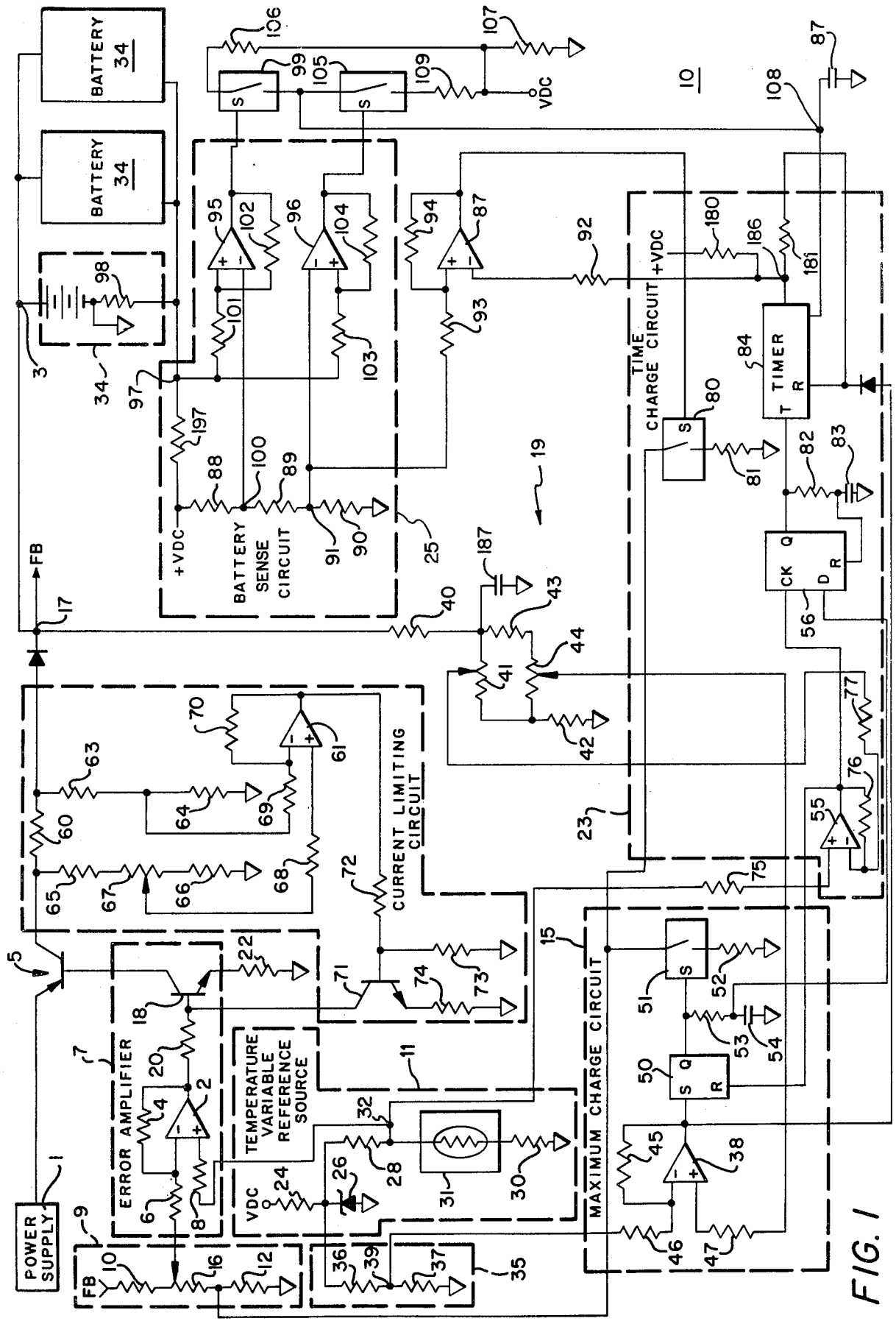
FIG. 1 is a schematic diagram of a battery charger according to the invention.

In FIG. 1, to which reference should now be made, there is shown a schematic diagram of a battery charger 10 according to the invention. The battery charger is essentially a regulated power supply in which a DC voltage is provided by a power supply 1 and applied to an output terminal 3 via a pass element 5. The conduction of the pass element 5 is controlled by an error amplifier 7 which compares a reference provided by an output voltage feedback reference source 9 with a temperature variable reference source 11. The difference between the two reference sources that is determined by the error amplifier 7 controls the conduction of the pass element 5 and, consequently, the voltage level that is applied to the output terminal 3. The battery charger 10, in the maintenance mode, acts as a series regulator. A current limiting circuit 13 limits the current that is drawn by the batteries 34 that are connected to terminal 3. A battery that is in the maintenance mode of charging which has a charge level greater than, in the case of lead acid batteries, 70 percent, has an input impedance that is high enough to prevent the battery charger from going into the current limiting mode and, in this condition, the battery charger will always remain in the voltage control mode.

In the case where the charger is connected to a lead acid battery, the open circuit voltage of a lead acid storage cell is an accurate indication of the state of charge if the cell has not been charged or discharged within the previous 24 hours. Even if the storage cell has been charged or discharged within the previous 24 hours, the dynamics impedance of the cell can be represented by the equation, $(\Delta V/\Delta T)$ where is $\Delta V$ the voltage change with charger current applied to the battery and $\Delta T$ is the time period over which the change occurred. The reason for this is that a battery that has been discharged will have an open circuit output voltage which will tend to indicate a lower percent of charge than actually exists. If the battery has stabilized for 24 hours or more, the percentage of charge will be accurately reflected by the open circuit output voltage. However, the present charger is designed to provide the maximum possible rate of charge to a battery and the $\Delta V/\Delta T$ equation is utilized to implement the exact charge to the battery in the fastest possible time that will not damage the storage cells. If the battery impedance is higher than is expected for a cell with a given open circuit voltage, the charger determines that it has a larger percentage of charge than the open circuit voltage indicates. Consequently, the charger may operate to prevent the charge of the lead acid storage cell to prevent the return of more charge than necessary and overcharge the cell which would reduce its life expectancy. It should be noted that to charge a depleted storage cell to 100 percent capacity the summation of the charge that is in the battery prior to charging and the amount of charge returned to the battery must be equal to 125 percent.

The decision to go into the charge mode of operation is made by the maximum charge circuit 15 which senses the battery voltage at node point 17 via the resistor divider network 19, and accesses its percent charge state by comparing the sensed and divided voltage with a selected reference that is provided by a reference source 35. If the percent of the charge of the battery is less than a selected level, which in the case of lead acid batteries is 70 percent, the charger will go into the charge mode. In the charge mode, the output of the error amplifier forces the pass element 5 into a high conduction mode of operation and consequently the pass element 5 will pass a high percentage of the voltage from the power supply 1 to the batteries 34 via the terminal 3. The battery impedance driven by this high voltage is low enough to cause the battery charger and, in particular, a current limiting circuit 13, to go into the current limiting mode. If the battery impedance doesn't rise, as indicated by $\Delta V/\Delta T$ in which $\Delta T$ is a selected time period that is measured, the charger will lock into the charge mode at the expiration of $\Delta T$. If, however, the impedance does rise rapidly, then the charger will return back to the maintenance mode to maintain a maintenance voltage at the terminal 3. During the first charge period, (the current limited period) a time charge circuit 23 monitors the output voltage at terminal 3 via node point 17 and resistor divider network 19 to ascertain when the battery charger has achieved a second predetermined level of charge which, in the case of the preferred embodiment, is 85 percent. It has been found that when a lead acid storage cell is charged beyond the 85 percent level its cell impedance varies widely. Above the second predetermined level it is difficult to determine what the charge status of the storage cell is by sensing the impedance determined by the current and voltage levels applied to the storage cell. However, there is a direct correlation between the voltage level of the storage cell and the temperature of the storage cell. Therefore, a temperature variable reference source 11 is used in conjunction with the sensed voltage for determining the 85 percent point of charge level. The storage cell impedance characteristics above the 85 percent charge state can be determined experimentally for a particular type of lead acid cell system. Knowing both the cell impedance characteristics and the output characteristics of the battery charger, the amount of time needed to return 40 percent more charge to the storage cell can be determined. The time charge circuit 23 can be set for the proper amount of time that will allow the charger to bring the storage cell to full capacity. The time controlled charging mode returns the storage cell to full capacity in a reasonable amount of time, with very little over or under charging. The current and voltage limits of the battery charger during this timed mode are chosen to reduce excessive charge conditions which would reduce cycle and service life of the storage cells. The time charge circuit 23 again controls the charging rate by forcing the error amplifier to control the conductance of the pass element 5. The current limiting circuit is operates during the timed mode but, rather than depending on the impedance of the storage cells, this stage is controlled by a timing circuit which applies the charging power to the battery over a selected period of time that insures the full charging of the battery without damaging the storage cells. Additionally, it has been found that the same charger may be used to drive more than one battery. The only effect the charging of more than one battery has on the charger is the period of time that the battery charger is in the second stage of charging. Consequently there is provided a battery sense circuit 25 which senses via internal resistor 98 in each battery the number of batteries that are connected to the battery chargers. Based upon this sensed circuit, the time period for the second stage of charging is varied to insure that all batteries which are connected to the battery charger are fully charged to the maximum capacity.

The above discussion provided a general overview of the operation of the circuitry in FIG. 1. A more detailed description follows. The error amplifier 7 contains an operational amplifier 2 whose gain is established by the feedback combination of resistors 4, 6 and 8. A voltage reference is provided by the voltage reference source 9 that includes the resistors 10 and 12 and the variable resistor 16. The output of the operational amplifier 2 is applied to a transistor 18 whose current gain is varied based upon the signal that is applied to the transistor 18 via a resistor 20. Biasing of the transistor 18 is provided by a resistor 22.

The temperature variable reference source 11 is provided a positive voltage from a source not shown and regulates the voltage by means of a resistor 24 and zener diode 26. A voltage divider chain includes resistors 28 and 30 and a thermistor 31. The thermistor 31 is thermally connected by being physically placed in close proximity to the batteries that are connected to terminal 3 and provides an accurate indication of the temperature of the casings of the batteries 34 that are connected to the terminal 3. The thermistor 31 will cause the voltage at node point 32 to vary as a function of both temperature and resistance of the thermistor 31. The temperature variable reference source 11 applies a reference voltage to the charger circuit which changes the output voltage of the charger to compensate for temperature effects on the storage cells during maintenance mode operation. Additionally, over temperature, this reference voltage is used to accurately determine the 85 percent charge level and the maximum voltage level that can safely be applied to the storage cells during charge and time controlled charging modes.

The maximum charge circuit 15, as indicated above, compares the voltage at node point 17 with the voltage that is provided by the reference voltage source 35 that includes a resistor network connected to a regulated voltage source. The resistor network includes resistors 36 and 37. Operational amplifier 38 compares the reference voltage that is provided by the reference voltage source 35 at node point 39 with a voltage that is provided by the resistor divider network 19. The resistor divider network 19 includes the series combination of resistor 40, variable potentiometer 41 and resistor 42, as well as the series combination of resistor 43 and variable potentiometer 44 that is in parallel with the variable potentiometer 41. The gain of the operational amplifier 38 is established by the feedback resistor 45 and the input resistors 46 and 47. When the voltage at node point 17, as divided by the resistor divider network 19, exceeds the voltage at node point 39, the RS flip-flop 50 is set causing a positive signal to be present on the Q terminal. The setting of the RS flip-flop 50 causes the relay 51 to be set placing a shunt resistor 52 in parallel with resistor 12 of the reference voltage source 9. This causes the error amplifier 7 to increase the conduction of the pass element 5 via the transistor 18. It was pointed out in the discussion above that when a battery had been recently discharged that the open circuit indication may not be an accurate reflection of the charge level. Therefore, to prevent overcharging of a lead acid storage cell, there is a timing circuit provided by the RC network of resistor 53 and capacitor 54. If the storage cell has been depleted fairly recently, the voltage level that is sensed at node point 17 will increase very rapidly. This voltage level is sensed and applied via the voltage divider network 19 to the time charge circuit 23 and, in particular, to a comparison circuit located within the time charge circuit 23. The comparison circuit includes an operational amplifier 55 that compares the voltage level that is divided down by the voltage divider network 19 and is applied from the wiper arm of the variable potentiometer 41 to the operational amplifier 55 via resistor 77 where it is compared with the temperature variable reference signal that is present at node point 32 and applied to the operational amplifier 55 via resistor 75. The rising voltage level will cause a positive going transition to be provided on the output of the operational amplifier 55 which will reset the RS flip-flop 50 as well as clocking the D type flip-flop 56. If the time constant of the RC network that includes the resistor 53 and the capacitor 54 is less than the time required for the voltage level at the wiper arm of potentiometer 41 to exceed the voltage level at node point 32, then, at the occurrence of the positive transition on the output of the operational amplifier 55, the D flip-flop 56 will not be set and the RS flip-flop will be reset removing the enable pulse from the relay 51 and placing the charger circuit back in the maintenance mode. The preceding procedures implement a $\Delta V/\Delta T$ check that prevents overcharging of the battery if the open circuit output voltage does not accurately reflect the charge status of the battery which, as was discussed above, is the case if the battery was recently charged or discharged. The battery charge without this $\Delta V/\Delta T$ feature would have forced the storage cells into a mandatory timed charge cycle which would have overcharged the storage cells because their charge state was already higher than 85 percent.

In the case where the lead acid storage cell has been depleted and charging is required, a clock pulse on the output of operational amplifier 55 will occur when the charge level of the battery that is connected to terminal 3 is at the 85 percent charge level. The 85 percent charge level is indicated by the voltage on node point 17. The first stage charging is complete at the 85 percent charge level and includes the charging range of from less than 70 percent charge level, the indication of a battery requiring charging, up to the 85 percent level. The first state charging is implemented by the maximum charge circuit 15. In this mode, the relay 51 is enabled and places a shunt resistor 52 in parallel with the resistor 12. The error amplifier 7 causes the pass element to increase conduction and the charger operates in the current limiting mode in the first state of charging. The current limiting circuit senses the current that flows to the batteries 34 via the terminal 3 by means of a sense resistor 60. The voltage that is developed across the sense resistor 60 is compared by an operational amplifier 61. This voltage is divided and adjusted by the resistor divider network that includes resistors 63 and 64 as well as the resistor divider network that includes resistor 65, 66 and potentiometer 67. The gain of the operational amplifier 61 is established by the resistors 68, 69 and 70. The output of the operational amplifier 61 is connected to a transistor 71 by a bias circuit that includes resistors 72 and 73. The current gain of the transistor 71 is established by the resistor 74 and, in response to the output of the operational amplifier 61, the current gain of the transistor 71 will control the base current of the transistor 18 that is located within the error amplifier 7. The controlling of the base gain of the transistor 18 will limit the conduction of the pass element 5 and therefore make the charging circuit current limiting.

As was mentioned earlier, the operational amplifier 55 detects the 85 percent charge level by means of comparing the voltage that is on the wiper arm of the potentiometer 41 with the temperature variable reference voltage that is present at node point 32. The gain of the operational amplifier 55 is established by the resistors 75, 76 and 77 and the output of which will clock the D flip-flop 56 at the 85 percent point. If there is a positive level on the D terminal of the D type flip-flop 56 then the Q output goes high.

There is a time constant provided by an RC network that includes a resistor 82 and a capacitor 83 which sets the D flip-flop 56 causing a pulse to appear on the queued terminal of the D flip-flop 56. This is achieved by the open collector output of timer 84, node 186, going low causing operational amplifier 87 output to go high bringing in relay 80, placing resistor 81 in parallel with resistor 12 of voltage source 9 changing the gain of the error amplifier 7. This pulse enables a timing circuit 84 that initiates a timing period for the battery to charge under the current and voltage limiting conditions controlled by the error amplifier 7.

The timer 84 includes a multivibrator circuit whose time period is established by an external time constant that includes resistors 106, 107, and 109 and capacitor 87 as well as, in the preferred embodiment, a divider circuit for dividing the pulses so that an extended time period may be obtained. In the preferred embodiment, the timer 84 was implemented by using two XR-2242 long range timers manufactured by EXAR Integrated Systems Incorporated, 750 Palimar Ave., Sunnyvale, Calif., 94088. At the expiration of the timing period the output of timer 84 allows node 186 to be pulled up to voltage VDC through resistor 180. The timer 84 is reset by a positive edge at node 186 which is applied to the reset port on timer 84 through resistor 181. The operational amplifier 87 compares terminal 186 voltage with a resistor network that includes resistors 86, 89 and 90. This causes the output of operational amplifier 88 to go low releasing relay 80, returning the charger to maintenance mode.

As was mentioned earlier, by extending the time period of the timer 84, any number of batteries 34 may be connected to the charge circuits provided ample current limiting capabilities are provided. The only requirement is that the time period be extended according to the number of batteries that are provided. The battery charger 10 illustrated in FIG. 1 provides capabilities of charging up to three batteries 34 and includes a battery sense circuit 25 that includes the voltage comparators 95 and 96. The voltage comparators will compare the voltage at point 97 with voltages at points 100 and 91, which have been determined by a voltage source (not shown) and the resistor divider circuit consisting of resistors 88, 89, and 90. If one battery pack 34 is attached to charger 10, the resistor 98 will create a voltage divider with resistor 197 and a voltage source (not shown); such that the voltage at point 97 is greater than the voltages at points 100 and 91. This condition forces the outputs of voltage comparators 95 and 96 high, pulling in relays 99 and 105 and thus paralleling timing resistors 107, 106, and 109 with each other. This parallel combination of timing resistors along with timing capacitor 87 and timer 84 form the shortest timed charge period of the battery charger. If a second battery pack 34 is attached to the charger 10 a second resistor 98 is put in parallel with resistor 98 of the first battery pack 34, causing the voltage at point 97 to go below the voltage at point 100. The output of voltage comparator 95 goes low releasing relay 99, leaving only resistors 107 and 109 in parallel, thus extending the time constant of the timer 84 to twice the amount of time of one battery pack. Adding a third battery pack 34 would leave only timing resistor 107, which extends the timing period even further (e.g., a multiple of that period equal to the number of battery packs being charged).

Many changes and modifications in the above described invention can, of course, be carried out without departing from the scope thereof. Accordingly, the invention is intended to be limited only by the scope of the appended claims.

We claim:

1. A battery charger comprising:
   means for providing a power source which delivers a charging signal to a battery;
   means coupled to said means for providing a power source and responsive to a control signal for controlling the charging signal delivered to a battery to be one of a first charging signal, a second maintenance charging signal and a third charging signal;
   first means for providing a first reference signal representative of a first predetermined charge level of a battery;
   second means for providing a second reference signal which is variable in accordance with the temperature of a battery and is representative of a second predetermined charge level of a battery;
   means for sensing the charge level of a battery and providing a charge level output signal;
   means responsive to said charge level output signal and said first reference signal for providing a control signal to said means for controlling and causing it to deliver a first charging signal when said battery charge level is less than said first predetermined charge level and a second maintenance charging signal when said battery charge level is equal to or greater than said first predetermined charge level;
   means responsive to said charge level output signal and said second reference signal for detecting when a battery charge level equals said second predetermined charge level and providing a control signal to said means for controlling and causing it to deliver a third charging signal for a predetermined charge period; and
   means responsive to the termination of said predetermined charge period for providing a control signal to said means for controlling and cause it to deliver said second maintenance charging signal.

2. The battery charger of claim 1 further comprising means for current limiting said charging signal.

3. The battery charger of claim 1 further comprising means responsive to said charge level output signal for determining when that charge level output signal does not accurately reflect the actual charge level of a battery and means responsive to said actual charge level being equal to or greater than said first predetermined charge level for causing said means responsive to said charge level output signal and said first reference signal to provide a control signal to said means for controlling and cause it to deliver said second maintenance charging signal.

4. The battery charger of claim 1 further comprising means for sensing the number of batteries to be charged and coupled to extend said predetermined charge period to a multiple of that period equal to the number of batteries being charged.

5. The battery charger of claim 1 wherein said means for controlling comprises:
   a first transistor having an emitter, collector, and base with said emitter being coupled to receive said charging signal and said collector being coupled to provide said charging signal to a battery;
   a second transistor having a collector, emitter, and base, said second transistor collector being coupled to the base of said first transistor and the emitter of said second transistor being coupled to ground;
   a first operational amplifier having first and second inputs and an output coupled to the base of said second transistor; and
   a first voltage divider having first and second terminals and a third terminal for providing a variable voltage, said first terminal being coupled to receive said charge level output signal, said second terminal being coupled to ground, and said third terminal being coupled to the first input of said first operational amplifier, said second means being coupled to provide said second reference signal to the second input of said operational amplifier.

6. The battery charger of claim 5 further comprising means responsive to the charging signal at the output of said collector of the first transistor for controlling the base of said second transistor to current limit said charging signal.

7. The battery charger of claim 6 wherein said second means comprises a source of regulated voltage and a thermistor coupled to said regulated source for providing a variable voltage output as the temperature variable second reference signal, said thermistor being coupled in physical contact to sense the temperature of a battery.

8. The battery charger of claim 7 wherein said first means comprises a second voltage divider having a first terminal coupled to said regulated source, a second terminal coupled to ground, and a third terminal coupled to provide a voltage as said first reference signal.

9. The battery charger of claim 8 wherein said means responsive to said charge level output signal and said first reference signal and said means responsive to said charge level output signal and said second reference signal each include means for changing the impedance of said first voltage divider to change its variable voltage output.

10. The battery charger of claim 9 wherein said means responsive to said charge level output signal and said first reference signal includes a second operational amplifier having first and second inputs and an output, said first input of said second operational amplifier being coupled to said third terminal of the second voltage divider, said second input of said second operational amplifier being coupled to receive said charge level output signal and said output of said second operational amplifier coupled to said means for changing the impedance of said first voltage divider.

* * * * *